United States Patent
Leis et al.

(10) Patent No.: US 7,941,800 B2
(45) Date of Patent: May 10, 2011

(54) TRANSFERRING DATA BETWEEN VIRTUAL MACHINES BY WAY OF VIRTUAL MACHINE BUS IN PIPE MODE

(75) Inventors: Benjamin A. Leis, Seattle, WA (US); Jacob Oshins, Seattle, WA (US); Christopher Eck, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1448 days.

(21) Appl. No.: 11/360,126

(22) Filed: Feb. 23, 2006

(65) Prior Publication Data
US 2007/0198976 A1    Aug. 23, 2007

(51) Int. Cl.
*G06F 9/455* (2006.01)
(52) U.S. Cl. ........................................... 718/1
(58) Field of Classification Search ............... 718/1
See application file for complete search history.

(56) References Cited

U.S. PATENT DOCUMENTS

| | | | |
|---|---|---|---|
| 7,181,744 B2 * | 2/2007 | Shultz et al. | 718/104 |
| 7,213,246 B1 * | 5/2007 | van Rietschote et al. | 718/1 |
| 2002/0016790 A1 * | 2/2002 | Arnold et al. | 707/104.1 |
| 2002/0129274 A1 * | 9/2002 | Baskey et al. | 713/201 |
| 2003/0177170 A1 * | 9/2003 | Glass | 709/203 |

* cited by examiner

*Primary Examiner* — Meng-Ai An
*Assistant Examiner* — Blake Kumabe
(74) *Attorney, Agent, or Firm* — Woodcock Washburn LLP (57) ABSTRACT

A computing device has a virtual machine bus (VM bus) operable in a pipe mode where all incoming data written to the VM bus from a source is passed through to be read from the VM bus by a sink, and a plurality of instantiated virtual machines (VMs). Each VM hosts an instance of an operating system upon an application may be instantiated. Each VM includes a computing object for issuing a call to a component object of another VM, and a VM bus system object for receiving the call and communicating same to a VM bus system object of the another VM by way of the VM bus. The VM bus system object is also for receiving the call from the VM bus system object of the another VM by way of the VM bus and for communicating the received call to the computing object.

19 Claims, 5 Drawing Sheets

TRANSFERRING DATA BETWEEN VIRTUAL MACHINES BY WAY OF VIRTUAL MACHINE BUS IN PIPE MODE

TECHNICAL FIELD

The present invention relates to a method and mechanism employed by a virtual machine or the like operating on a computing device or the like to transfer date or the like to another virtual machine by way of a virtual machine bus but without the need for a general purpose bus stack. In particular, a need exists for such a method and mechanism that is not specific to any particular virtual machine, that is relatively simple, and that limits the nature of the data that can be transmitted such that security is achieved.

BACKGROUND OF THE INVENTION

As should be appreciated, a virtual machine is a software construct or the like operating on a computing device or the like for the purpose of emulating a hardware system. Typically, although not necessarily, the virtual machine is an application or the like and is employed on the computing device to host a user application or the like while at the same time isolating such user application from such computing device or from other applications on such computing device. A different variation of a virtual machine may for example be written for each of a plurality of different computing devices so that any user application written for the virtual machine can be operated on any of the different computing devices. Thus, a different variation of the user application for each different computing device is not needed.

New architectures for computing devices and new software now allow a single computing device to instantiate and run a plurality of partitions, each of which can be employed to instantiate a virtual machine to in turn host an instance of an operating system upon which one or more applications may be instantiated. Typically, although not necessarily, the computing device includes a virtualization layer with a virtual machine monitor or the like that acts as an overseer application or 'hypervisor', where the virtualization layer oversees and/or otherwise manages supervisory aspects of each virtual machine, and acts as a possible link between each virtual machine and the world outside of such virtual machine.

Among other things, a particular virtual machine on a computing device may require access to a resource associated with the computing device. As may be appreciated, such resource may be any sort of resource that can be associated with a computing device. For example, the resource may be a storage device to store and retrieve data, and generally for any purpose that a storage device would be employed. Likewise, the resource may be any other asset such as a network, a printer, a scanner, a network drive, a virtual drive, a server, a software application, and the like. Accordingly, whatever the resource may be, the virtual machine may in fact be provided with access to services provided by such resource.

In a computing device with multiple partitions instantiated, any particular resource of the computing device may be dynamically assigned to a particular partition/virtual machine (hereinafter 'virtual machine' or 'VM') so that the particular VM can directly control such resource and service requests for the resource from other VMs on the computing device. Such particular VM, then, is in effect a host that provides resource capabilities as a resource host VM ('VM-H') that 'owns' the particular resource. Similarly, such VM-H provides resource services to another VM which is in effect a client that consumes such capabilities as a resource client VM ('VM-C'). Thus, the VM-C and the VM-H in combination accomplish operations that require use of the particular resource.

A particular VM-C operating on a computing device typically is constructed to operate as if a real machine. That is, the particular VM-C in accessing a particular resource typically acts as if such particular resource is accessible by way of direct requests thereto. Accordingly, it may be the case that the VM-C has constructed a path or stack (hereinafter, 'stack') of drivers to which such requests are directed, with the expectation being that the particular resource is at the end of the stack. As has been established, however, the VM-C is not in fact a real machine and the particular resource is not in fact at the end of the stack.

Accordingly, it may be the case that the resource is emulated by the virtualization layer/virtual machine monitor as being at the end of the stack. In reality, the virtualization layer forwards a request for the resource to the VM-H that owns or has access to such resource. Alternatively, the VM-C may be endowed with enlightened capabilities in which such VM-C is aware of the virtual existence thereof, and sends requests to the particular resource by way of an 'enlightened' stack at the end of which is a VM (virtual machine) bus or other communications path that connects the VM-C with the VM-H that owns or has access to the resource, where the VM bus bypasses the virtualization layer. Thus, the VM-C in the enlightened mode is aware that the particular resource can be accessed by way of the VM-H, and accordingly establishes a connection with the VM-H by way of the aforementioned enlightened stack and VM bus. In such a manner, each request sent by the VM-C to the particular resource follows a direct channel to the particular resource by way of the corresponding VM-H.

As may be generally appreciated, the VM bus is a partition bus accessible by each VM. Each VM may have many channels in operation on the VM bus, each channel being operated in one of a number of different modes. Each channel may be defined by the endpoints thereof, each of which is most likely a service running within a VM. Inasmuch as each channel mode has a corresponding protocol, the VM may have many protocols in operation simultaneously. As known, each service within a VM that is associated with a channel of the VM bus is a client of the VM bus and can employ its own protocol for moving data between partitions by way of such VM bus. However, it should be clear that each service having its own VM bus protocol is cumbersome, and largely unnecessary. Thus, a need exists for a relatively simple protocol that can be employed by many services within a VM.

As may also be generally appreciated, at least some services of VMs are not performance-sensitive and not likely to take advantage of specialized modes which VM bus can be configured to use when the VM employs a particular custom protocol. In particular, services of VMs such as those that are written with user-mode code for the purpose of user interface integration are usually structured around very high-level programming constructs, such as but not limited to Component Object Model (COM) objects. Such constructs already support execution across multiple machine images using Remote Procedure Calls (RPCs). Thus, a need exists for a VM bus protocol that supports constructs such as RPCs on top of the VM bus. With such a VM bus protocol, such COM objects can be constructed with the same methods that are currently used to develop other code that involves cross-machine operation.

SUMMARY OF THE INVENTION

The aforementioned needs are satisfied at least in part by the present invention in which a computing device has a virtual machine bus (VM bus) operable in a pipe mode where all incoming data written to the VM bus from a source is passed through to be read from the VM bus by a sink, and a plurality of virtual machines (VMs) instantiated on the computing device, where each VM hosts an instance of an operating system upon which one or more applications may be instantiated. Each VM includes a distributed computing object for issuing a call to a distributed component object of another VM or for issuing a return of a response to a call from a distributed component object of the another VM.

Each VM also includes a VM bus system object for receiving the call or the return from the distributed computing object and for communicating the received call or return to a VM bus system object of the another VM by way of the VM bus. The VM bus system object is also for receiving the call or the return from the VM bus system object of the another VM by way of the VM bus and for communicating the received call or return to the distributed computing object.

The virtual machines include a host virtual machine (VM-H) for providing a service and a client virtual machine (VM-C) that can access the VM-H by way of the VM bus and consume the service provided by the VM-H. The distributed computing object of the VM-C issues a call to the distributed computing object of the VM-H to request the service and the distributed computing object of the VM-H issues a return as a response to the call of the distributed computing object of the VM-C.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
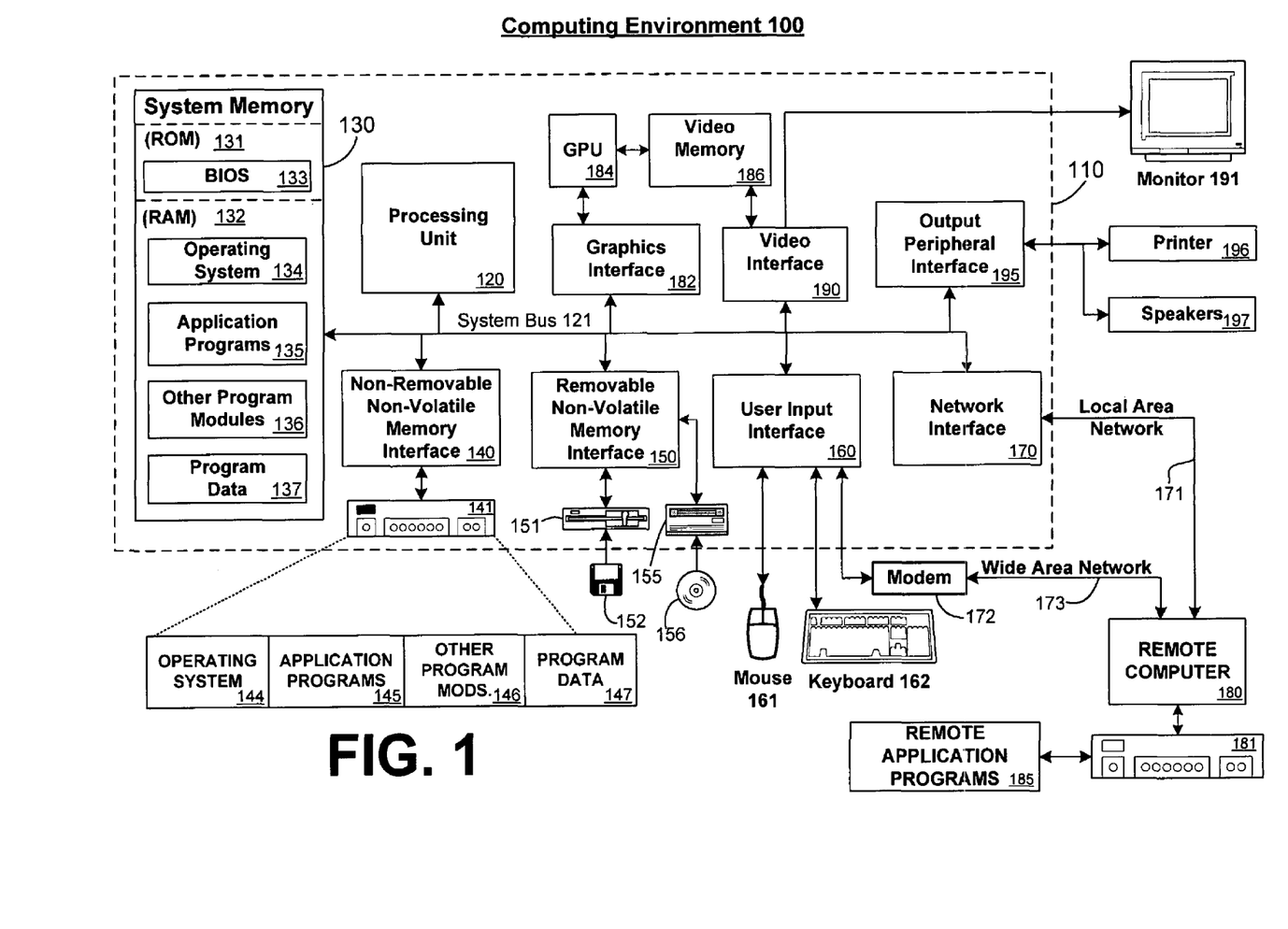
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
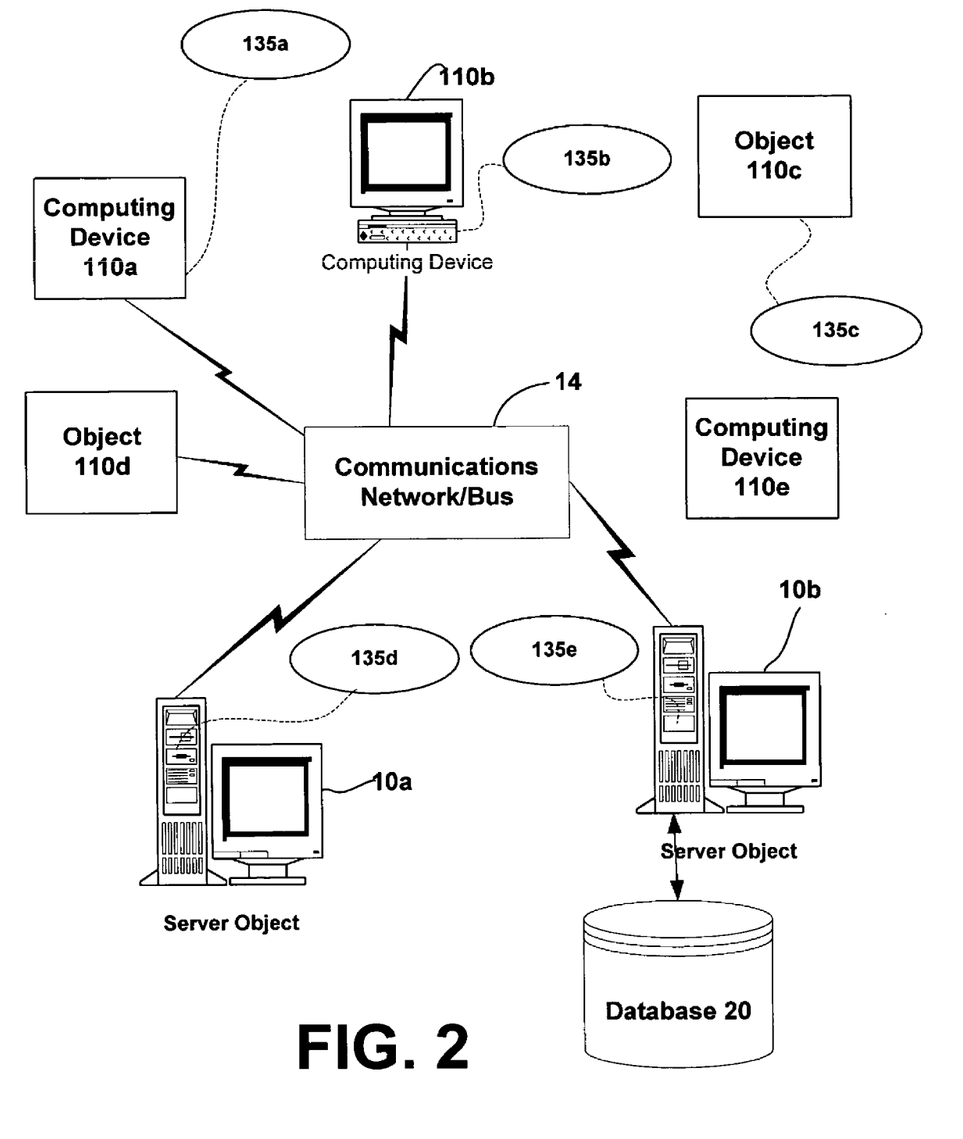
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Partitioned Computing Device

Figure 3:
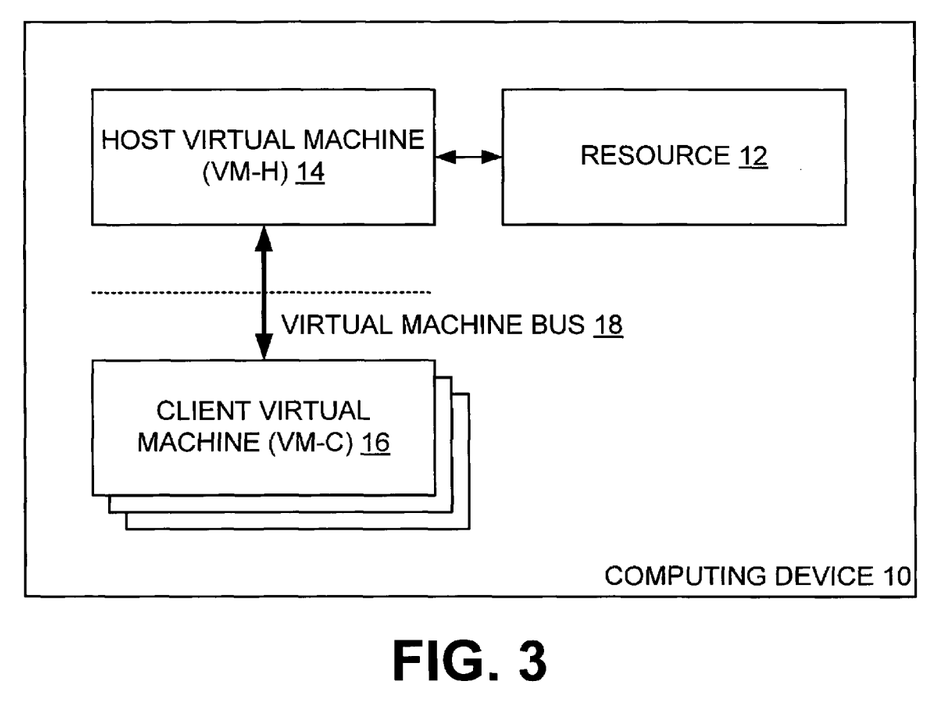
FIG. 3 is a block diagram showing a computing device running a plurality of partitions including a host partition with a virtual machine (VM-H) that owns a particular resource and provides resource services therefor, and a client partition with a virtual machine (VM-C) that employs the resource services of the VM-H in accordance with embodiments of the present invention.

Turning now to FIG. 3, a computing device 10 includes a particular resource 12 that is employed to provide a resource service to the computing device 10. Such computing device 10, resource 12, and resource service may be any appropriate computing device, resource, and resource service without departing from the spirit and scope of the present invention. For example, the computing device 10 may be a personal computer such as a desktop or laptop computer or the like with a hard disk drive as the resource 12 providing data storage services. Likewise, the computing device 10 may be a portable playback machine such as a portable audio or video player with a display screen as the resource 12 providing display services. Similarly, the computing device 10 may be a server machine with a data communications network as the resource 12 providing communications services. In a similar manner, the server machine may itself be the resource 12. Note that the resource 12 may be a particular piece of hardware or even software, an adapter for accessing a particular piece of hardware or software, a remote service, a local service, a combination thereof, and the like.

Significantly, the computing device 10 has been configured to run a plurality of partitions, where each partition can be employed to instantiate a virtual machine to in turn host an instance of an operating system upon which one or more applications may be instantiated. As seen, in such computing device 10, the particular resource 12 of the computing device 10 is assigned to a particular partition or virtual machine 14 (hereinafter, VM 14) so that the particular VM 14 can directly control such particular resource 12. Such particular VM 14, then, is a host that provides resource capabilities ('VM-H 14'). Similarly, such VM-H 14 provides resource services to one or more other VMs 16, each of which is in effect a client that consumes such services ('VM-C 16'). Typically, each VM-C 16 and the VM-H 14 communicate by way of a pipe or channel such as a virtual machine (VM) bus 18 or the like to accomplish resource-related operations, as will be set forth in more detail below.

Figure 4:
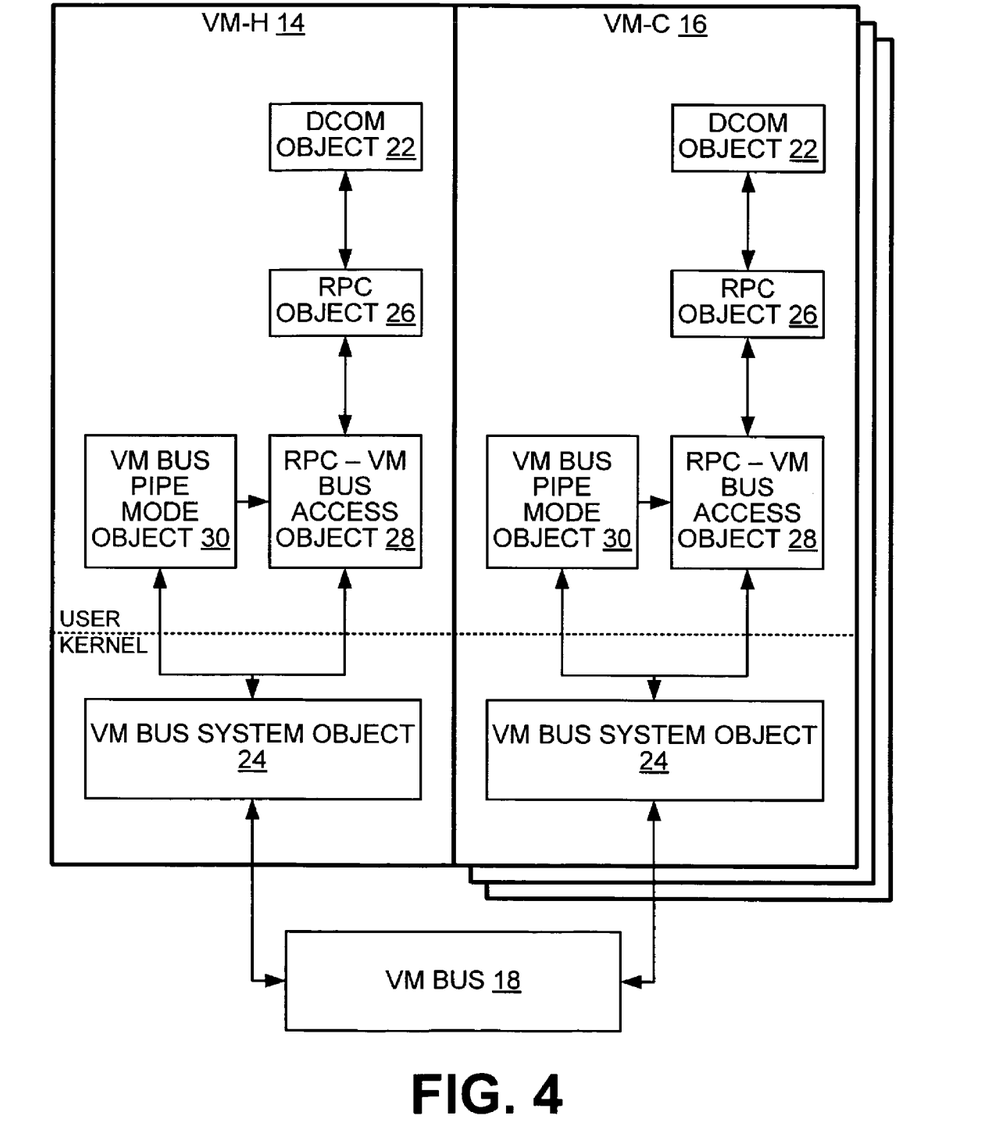
FIG. 4 is a block diagram showing the VM-H and VM-C of FIG. 3 in additional detail in accordance with one embodiment of the present invention.

As shown in FIG. 4, the computing device 10 of FIG. 3 and each VM 14, 16 thereof are functionally operated to include both a user mode and a kernel mode, although such modes are not perceived to be absolutely necessary for purposes of the present invention. At any rate, and as may be appreciated, the user mode is a generally non-privileged state where executing code is forbidden by the hardware from performing certain operations, such as for example writing to memory not assigned to such code. Generally such forbidden operations are those which could destabilize the operating system of the VM 14, 16 or constitute a security risk. In terms of the operating system, the user mode is an analogous non-privileged execution mode where the running code is forbidden by the kernel from performing potentially dangerous operations such as writing to system configuration files, killing other processes, rebooting the system, and the like.

As may also be appreciated, the kernel mode or privileged mode is the mode in which the operating system and related core components run. Code running in the kernel mode has unlimited access to the system memory and resources that are assigned to the VMs/partitions 14, 16. Generally, the amount of code running in kernel mode is minimized, both for purposes of security and elegance. Roughly speaking, a user of a computing device 10 interfaces therewith most directly through the user mode and applications operating therein, while the computing device 10 interfaces with resources, including the particular resource 12, most directly through the kernel mode.

Note that with the user and kernel modes as set forth above, the VM-H 14 and VM-C 16 may each have a VM bus stack (not shown) for accessing the VM bus 18 so as to exchange data therebetween in the course of the VM-C 16 accessing the resource 12 by way of the VM-H 14. Such a VM bus stack is generally known, and may for example include among other things a class driver and a port driver. However, it is to be appreciated that the VM bus stack represents somewhat of a security risk in that such VM bus stack allows practically any entity access to the VM bus 18. Also, the VM bus stack is somewhat complex and provides a relatively large amount of functionality for accessing and employing the VM bus 18, and therefore may in some circumstances be excessive, especially when only relatively simple tasks need be performed.

Instead, for matters such as relatively simple matters, what is needed is a mode of employing the VM bus 18 that provides a programming interface, particularly but not necessarily for user-mode programs, that is conceptually similar to existing transport mechanisms, using file handles and existing read/write interface commands. With such an interface, existing communications protocols such as DCOM and RPC may employ the VM bus 18. Moreover, such existing protocols already contain built-in features that in effect police the types of information that may be sent over the VM bus 18.

VM Bus 18 Operated in Pipe Mode

The VM bus 18 may be established as an object in and of itself on the computing device 10, or may instead be establishes as a conceptual object that does not in and of itself exist, without departing from the spirit and scope of the present invention. In the latter case, and as should be appreciated, such conceptual VM bus 18 is manifested as a communications conduit between VMs 14, 16 when such VMs 14, 16 choose to establish communications therebetween. In particular, the manifestation of such VM bus 18 may be considered to arise when, in the course of the VMs 14, 16 choosing to communicate therebetween, such VMs 14, each establish the necessary services for such communication and in fact employ such services to so communicate. In such instance, the communications may occur over any appropriate communications medium within the computing device 10 without departing from the spirit and scope of the present invention.

It should be appreciated that at least some VMs 14, 16 operating as clients of the VM bus 18 are most naturally structured around the concept of a stream. That is, such VMs 14, 16 require only the ability to read and write data to and from the VM bus 18, perhaps as bytes or packets. For example, and in one scenario, and turning specifically to FIG. 4 now, a VM-C 16 may have a distributed component object model (DCOM) object 22 that makes a remote procedure call (RPC), and a corresponding VM-H 14 may have a corresponding DCOM object 22 that receives the RPC from the VM-C 16, acts on same, and returns a result based thereon to the calling VM-C 16. As may be appreciated, both the DCOM object 22 of the calling VM-C 16 and the returning VM-H 14 need only send data therebetween as a stream of packets or bytes or the like.

As may be appreciated, both DCOM and RPC are known or should be apparent to the relevant public, and therefore need not be set forth herein in any detail. Further, most any other stream-based system of sending and receiving data other than DCOM and RPC may also be employed without departing from the spirit and scope of the present invention. Notably, DCOM and RPC in particular is a good example of a stream-based system such as may be employed in connection with the present invention, especially inasmuch as many higher-level services are now performed in computer devices 10 and systems, such as for example Drag-and-Drop, by way of DCOM and RPC.

At any rate, for stream-based VMs 14, 16 that only require reading and writing streams of data, the VM bus 18 already includes a "pipe mode" whereby all incoming data written to the VM bus 18 from a source such as the VM-C 16 or VM-H 14, and is passed through to be read from the VM bus 18 by a sink as the corresponding VM-H 14 or VM-C 16. As may be appreciated, pipe mode is established at each of the source and sink by way of an appropriate driver or other object that provides protocol definition functions including a function which copies all write data from a write request into the VM bus 18, perhaps by way of an intermediate buffer, and also a function which copies all read data into a read request from the VM bus 18, also perhaps by way of an intermediate buffer.

Such VM bus 18 and specifically such VM bus 18 operating in pipe mode is known or should be apparent to the relevant public, and therefore need not be set forth herein in any detail. Notably, although the present invention is set forth in terms of a VM bus 18 operating in pipe mode, the present invention should be understood to encompass most any data bus system operated in a functionally similar mode.

Still referring to FIG. 4, it is seen that in one embodiment of the present invention, the VM bus 18 is employed in pipe mode to exchange data between a VM-C 16 and a VM-H 14 with the aid of the following objects in each of such VM-H 14 and VM-C 16. Preliminarily, each VM 14, 16 has a DCOM object 22 or the like. As may be appreciated, the DCOM object 22 in the VM-C 16 calls to the DCOM object 22 in the VM-H 14 to perform a service for the VM-C 16, where such service may be any particular service without departing from the spirit and scope of the present invention, and the DCOM object 22 in the VM-H 14 upon performing the service responds to the DCOM object 22 in the VM-C 16 with appropriate return information.

As may be appreciated, in order to accomplish each of the call and the return, the DCOM object 22 in each of the VMs 14, 16, must appropriately command the VM bus 18 to read or write data, as the case may be. That is, for a call, the DCOM object 22 in the VM-C 16 must command a write of data to the VM bus 18, and the DCOM object 22 in the VM-H 14 must likewise command a read of the written data from the VM bus 18. Similarly, for a return, the DCOM object 22 in the VM-H 14 must command a write of data to the VM bus 18, and the DCOM object 22 in the VM-C 16 must likewise command a read of the written data from the VM bus 18. Note here that each read in particular may indeed be issued before the corresponding write, in which case the read is satisfied once written data is in fact received.

As seen in FIG. 4, each such command is ultimately received at a VM bus system object 24 in the kernel of the VM 14, 16 of the issuer of such command. As may be appreciated, each such VM bus system object 24 implements communication with the VM bus 18 for the corresponding VM 14, 16, and also performs whatever commands may be necessary to place the VM bus 18 into pipe mode with respect to the VM-H 14 and VM-C 16. Thus, among other things, the VM bus system object 24 may implement the aforementioned intermediate buffers.

Upon the DCOM object 22 in either the VM-H 14 or VM-C 16 issuing any particular command, and as seen in FIG. 4, such command is forwarded to a corresponding RPC object 26 for appropriate packaging and further forwarding. In particular, the DCOM object 22 may issue the command directly to the corresponding RPC object 26 or may issue the command by way of a handle if necessary or desired, and the RPC object 26 packages the command in an appropriate format that is understood by the RPC object 26 of the opposite VM 14, 16 so as to include the command itself, all associated data, and any other necessary command-related information. Note here that the RPC object 26 also can upon receiving a packaged command in an appropriate format un-package same to reveal the original command contained therein.

Such packaging as performed by each RPC object 26 is known or should be apparent to the relevant public and therefore need not be set forth herein in any detail. Notably, any particular type of packaging may be performed by each RPC object 26 without departing from the spirit and scope of the present invention. In fact, if the DCOM object 22 can appropriately package each command thereof, the RPC object 26 may be dispensed with. Note, though, that the RPC object 26 performs a significant security function in that such RPC object 26 only packages commands understood thereby. Accordingly, the RPC object 26 may be matched to the DCOM object 22 and only allow commands from such DCOM object 22 to be packaged and forwarded. Put another way, any commands to the RPC object 26 from sources other than the DCOM object 22 likely will be prevented from being packaged and forwarded.

Each package as produced by an RPC object 26 is in fact forwarded on to the VM bus 18 by being sent from the RPC object 26 to a corresponding RPC-VM bus access object 28. Similar to before, the RPC object 26 may issue the package directly to the corresponding RPC-VM bus access object 28 or may issue the package by way of a handle if necessary or desired, and the RPC-VM bus access object 28 passes the package to the aforementioned VM bus system object 24 for processing thereby.

Notably, each RPC-VM bus access object acts to expose the VM bus 18 in pipe mode to the corresponding RPC object 26. That is, the RPC object 26 can transmit a package by way of the VM bus 18 in pipe mode only when the RPC-VM bus access object 28 is present, and correspondingly cannot transmit such a package by way of the VM bus 18 in pipe mode when the RPC-VM bus access object 28 is absent. Conceivably, the RPC object 26 can transmit the package directly to the VM bus system object 24 without departing from the spirit and scope of the present invention if the necessary functionality is included within such RPC object 26. However, for purposes of modularity it is likely that such necessary functionality should be separate from the RPC object 26.

Typically, although not necessarily, each RPC-VM bus access object 28 communicates with the corresponding VM bus system object 24 by way of a file handle to such VM bus system object 24. Accordingly, each VM 14, 16 may include a VM bus pipe mode object 30 that administratively opens a channel to the VM bus system object 24 and commands same to instantiate the pipe mode, that obtains a file handle for accessing such VM bus system object 24, and that therefore may provide such file handle to the corresponding RPC-VM bus access object 28 to in fact allow such RPC-VM bus access object 28 to communicate with the corresponding VM bus system object 24. Note here that the VM bus pipe mode object 30 is a collection of functions that is intended to simplify discovery of the VM bus 18 and the VM bus system object 24 and also to simplify connection with same. Accordingly, each package as received at a RPC-VM bus access object 28 is forwarded thereby to the corresponding VM bus system object 24 by way of the handle thereof as provided by the corresponding VM bus pipe mode object 30.

Note too that in at least some instances, the VM bus access object 28 may itself be such a file handle. As such, it is to be appreciated that such a file handle is not merely a pointer or reference to an object, but represents an agreement between the sender that is to send data by way of the file handle and the receiver that is to receive such data, including a well-defined set of semantics surrounding the agreement. The agreement of the file handle of the present invention, in particular, specifies an ordered set of bytes (or stream) and optionally a file pointer (or counter) that defines the current offset within the stream. By employing such a file handle, the existing body of software that deals with streams may be employed to read and write data to the VM bus 18 in pipe mode.

Figure 5:
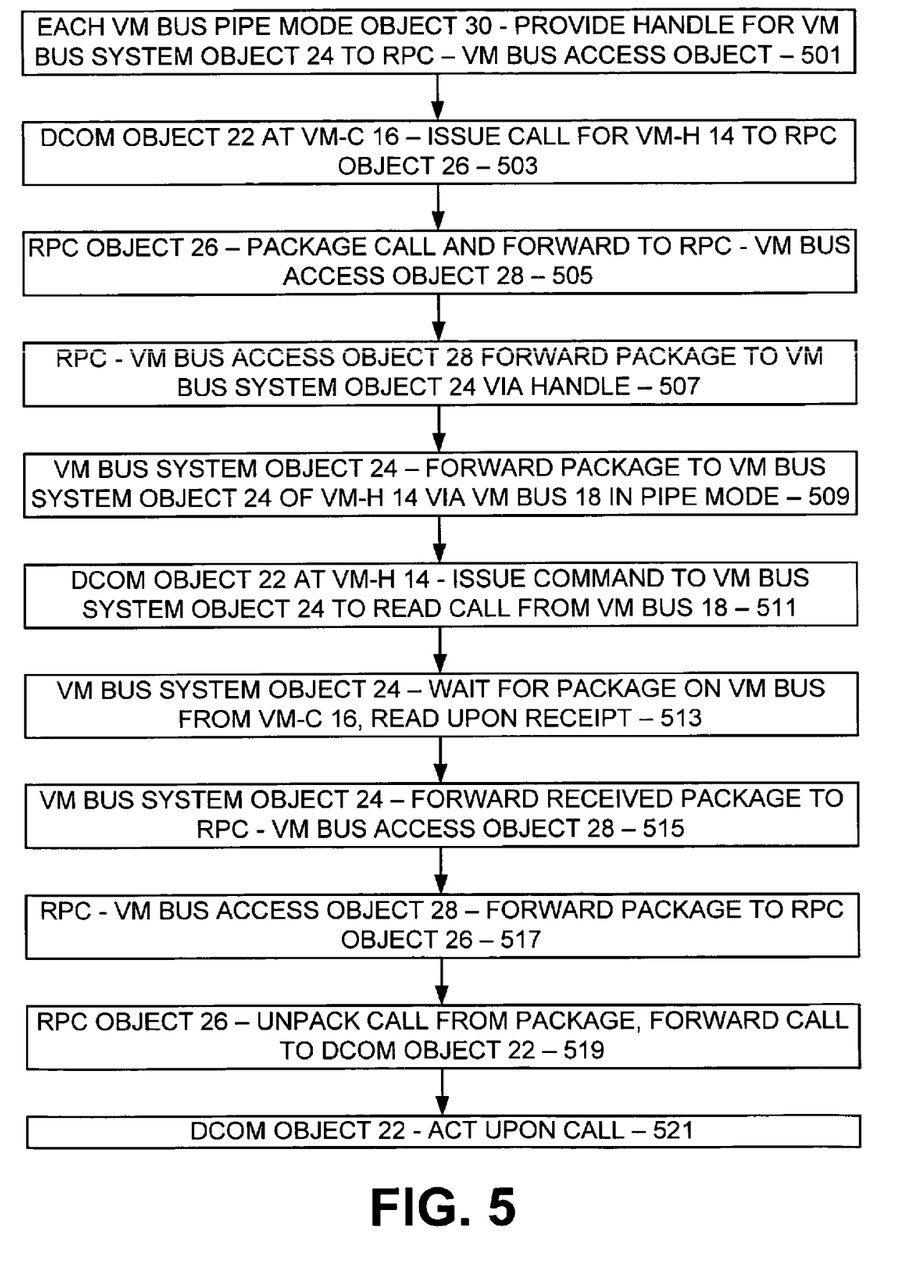
FIG. 5 is a flow diagram showing key steps performed by various objects of the VM-H and VM-C of FIG. 3 to perform an RPC from the VM-C to the VM-H in one embodiment of the present invention.

Turning now to FIG. 5, it is seen that in one embodiment of the present invention the system shown in FIG. 4 is employed to write a call from a VM-C 16 to a VM-H 14 and read a return from the VM-H 14 to the VM-C 16 in the following manner. Preliminarily, and as should now be appreciated, all of the relevant objects 22-30 are instantiated at both VMs 14, 16 in an appropriate manner, and in the course of doing so, each VM bus pipe mode object 30 administratively opens a channel to the corresponding VM bus system object 24, commands same to instantiate the pipe mode, obtains a handle for accessing such VM bus system object 24, and provides such handle to the corresponding RPC-VM bus access object 28 (step 501).

Thereafter, at some point the DCOM object 22 at the VM-C 16 in fact issues the call for the VM-H 14 to the corresponding RPC object 26 (step 503), such corresponding RPC object 26 packages the call into an appropriately formatted package and forwards same to the corresponding RPC-VM bus access object 28 (step 505), the RPC-VM bus access object 28 thereafter forwards the package to the corresponding VM bus system object 24 by way of the handle as received from the corresponding VM bus pipe mode object 30 (step 507), and the VM bus system object 24 forwards the package to the VM bus system object 24 of the VM-H 14 by way of a write of the data of the package to the VM bus 18 in pipe mode (step 509). Note here that in doing so the VM bus system object 24 of the VM-C 16 may include with the forwarded package a packet describing such package to the VM bus system object 24 of the VM-H 14.

Notably, for the DCOM object 22 at the VM-H 14 to receive the call from the DCOM object 22 of the VM-C 16, such DCOM object 22 of the VM-H 14 must issue a command to the corresponding VM bus system object 24 to read the call from the VM bus 18 (step 511). Note that such command may be in the form of a call similar to that issued by the DCOM object 22 of the VM-C 16, or may be of a different format. If a call in particular, and similar to that which was set forth immediately above, at some point the DCOM object 22 at the VM-H 14 in fact issues to the corresponding RPC object 26 the call to read the data of the package from the VM-C 16, such corresponding RPC object 26 packages the call into an appropriately formatted package and forwards same to the corresponding RPC-VM bus access object 28, and the RPC-VM bus access object 28 thereafter forwards the package to the corresponding VM bus system object 24 by way of the handle as received from the corresponding VM bus pipe mode object 30.

Here, though, the VM bus system object 24 of the VM-H 14 responds to such package by waiting for the package on the VM bus 18 in pipe mode as sent from the VM-C 16, and upon receipt reading same (step 513). As may now be appreciated, the VM bus system object 24 forwards the received package to the DCOM object 22 of the VM-H 14 by a similar path but in the opposite direction. In particular, the VM bus system object 24 forwards the received package to the corresponding RPC-VM bus access object 28 (step 515), which in turn forwards the package to the corresponding RPC object 26 (step 517). As should be understood, such RPC object 26 at the VM-H 14 upon receiving the package unpacks the call therein from same and forwards such unpacked call to the corresponding DCOM object 22 of the VM-H 14 (step 519), and such DCOM object 22 may thereafter act upon the unpacked call in whatever manner is deemed appropriate, be it with regard to a resource 12 owned by the VM-H 14 or otherwise (step 521).

As was set forth above, upon acting on the unpacked call, the DCOM object 22 of the VM-H 14 issues a return to the DCOM object 22 of the VM-C 16. As should be appreciated, such return may simply be an acknowledgment that the call has been received, may include data as requested by the call, or the like, and such return is effectuated by following essentially the same steps of FIG. 5. Here, though, it should be understood that the call of FIG. 5 from the VM-C 16 to the VM-H 14 and corresponding actions is replaced by the corresponding return from the VM-H 14 to the VM-C 16 and corresponding actions.

CONCLUSION

The programming necessary to effectuate the processes performed in connection with the present invention is relatively straight-forward and should be apparent to the relevant programming public. In particular, the programming necessary to construct each of the objects 22-30 should be apparent based on the functionality necessary for each such object. Accordingly, such programming is not attached hereto. Any particular programming, then, may be employed to effectuate the present invention without departing from the spirit and scope thereof.

In the present invention, a method and mechanism is provided with regard to a VM bus 18 of a computing device 10 to allow each VM 14, 16 on the computing device 10 to access the VM bus 18 by way of a single, relatively simple protocol. The protocol supports constructs such as RPC object 26s on top of the VM bus 18. Thus, a DCOM object 22 or the like can be constructed with the same methods that are currently used to develop other code that involves cross-machine operation.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computing device comprising:
    a virtual machine bus (VM bus) operable in a pipe mode where all incoming data written to the VM bus from a source is passed through to be read from the VM bus by a sink; and
    a plurality of virtual machines (VMs) instantiated on the computing device, the plurality of VMs comprising a host virtual machine (VM-H) and a client virtual machine (VM-C), each VM configured to host an instance of an operating system upon which one or more applications may be instantiated, wherein each VM comprises:
        a VM bus system object configured to place the VM bus in the pipe mode with the VM being the source and with another VM of the plurality of VMs as the sink, and
        a computing object configured to issue a call to the other VM and to issue a response to a call from the computing object of the other VM via the VM bus;
    a service the VM bus
    wherein the VM-C is configured to request a service from the VM-H by the VM bus system object of the VM-C placing the VM bus in the pipe mode with the VM-C as the source and the VM-H as the sink, and by the computing object of the VM-C issuing a call to the computing object of the VM-H via the VM bus to request the service;
    wherein the VM-H is configured to respond to the call issued by the VM-C by the VM bus system object of the VM-H placing the VM bus in the pipe mode with the VM-H as the source and the VM-C as the sink, and by the computing object of the VM-H providing the service to the VM-C via the VM bus in response to receiving the call issued by the VM-C.

2. The computing device of claim 1 wherein the computing object is a distributed component object model (DCOM) object.

3. The computing device of claim 1 wherein each VM further comprises a remote calling object;
    wherein the remote calling object is configured to receive the call or the response from the computing object of the VM, to package the call or the response into a package, and to forward the package to the VM bus system object of the VM, and
    wherein the remote calling object is configured to receive the call or the response from the VM bus system object of the VM, to un-package the call or the return, and to forward the un-packed call or return to the computing object of the VM.

4. The computing device of claim 3 wherein the remote calling object is a remote procedure call (RPC) object.

5. The computing device of claim 3 wherein the computing object is a distributed component object model (DCOM) object and the remote calling object is a remote procedure call (RPC) object.

6. The computing device of claim 5 wherein the remote calling object of each VM is configured to package the call or the response only if the remote calling object understands the call or the response as originating from the computing object of the VM.

7. The computing device of claim 1 wherein each VM further comprises a VM bus access object;
    wherein the VM bus access object is configured to expose the VM bus in pipe mode to the computing object of the VM, to receive the call or the response from the computing object of the VM, and to pass the call or the response to the VM bus system object of the VM; and
    wherein the VM bus access object is further configured to receive the call or the response from the VM bus system object of the VM and to pass the call or the response to the computing object of the VM.

8. The computing device of claim 7 wherein the VM bus access object of each VM is configured to communicate with the VM bus system object of the VM by way of a handle to such VM bus system object.

9. The computing device of claim 8 wherein each VM further comprises a VM bus pipe mode object that is configured to administratively open a channel to the VM bus system object of the VM and commands same to instantiate the pipe mode, to obtain the handle for accessing such VM bus system object of the VM, and to provide the handle to the VM bus access object of the VM.

10. The computing device of claim 8 wherein each VM further comprises a VM bus pipe mode object that is configured to administratively open a channel to the VM bus system object of the VM and commands same to instantiate the pipe mode, to obtain the handle for accessing such VM bus system object of the VM, and to provide the handle as the VM bus access object of the VM, wherein the handle includes a well-defined set of semantics specifying a stream as an ordered set of bytes and optionally a file pointer that defines a current offset within the stream.

11. A method with regard to a computing device comprising:
    a virtual machine bus (VM bus) operable in a pipe mode where all incoming data written to the VM bus from a source is passed through to be read from the VM bus by a sink; and
    a plurality of virtual machines (VMs) instantiated on the computing device, the plurality of VMs comprising a host virtual machine (VM-H) and a client virtual machine (VM-C), each VM configured to host an instance of an operating system upon which one or more applications may be instantiated, wherein each VM comprises:
        a VM bus system object configured to place the VM bus in the pipe mode with the VM being the source and with another VM of the plurality of VMs as the sink, and
        a computing object configured to issue a call to the other VM and to issue a response to a call from the computing object of the other VM via the VM bus;
    the method comprising:
    placing, by the VM bus system object of the VM-C, the VM bus in the pipe mode with the VM-C as the source and the VM-H as the sink;
    issuing a call, by the computing object of the VM-C, to the computing object of the VM-H for the service via the VM bus in pipe mode, the call comprising a request for a service to be provided by the VM-H;
    receiving the call, by the VM bus system object of the VM-H, from the VM bus system object of the VM-C via the VM bus in pipe mode;
    communicating the received call from the VM bus system object of the VM-H to the computing object of the VM-H;
    placing, by the VM bus system of the VM-H, the VM bus in the pipe mode with the VM-H as the source and the VM-C as the sink;

providing, by the VM-H, the service to the VM-C via the VM bus in response to receiving the computing object of the VM-H receiving the call from the VM bus system object of the VM-H.

12. The method of claim 11 further comprising:
receiving the call, by a remote calling object of the VM-C, from the computing object of the VM-C:
packaging, by the remote calling object of the VM-C, the received call into a package;
forwarding, by the remote calling object of the VM-C, the package toward the VM bus system object of the VM;
receiving the call, by a remote calling object of the VM-H, from the VM bus system object of the VM-H; and
un-packaging the call by the remote calling object of the VM-H; and
forwarding the un-packed call from the remote calling object of the VM-H to the computing object of the VM-H.

13. The method of claim 12 wherein the remote calling object of the VM-C packages the call only if the remote calling object understands the call as originating from the computing object of the VM-C.

14. The method of claim 11 further comprising:
exposing the VM bus in pipe mode, by a VM bus access object of the VM-C, to the computing object of the VM-C;
receiving the call, by the VM bus access object of the VM-C, from the computing object of the VM-C;
passing the call from the VM bus access object of the VM-C to the VM bus system object of the VM-C;
exposing the VM bus in pipe mode, by a VM bus access object of the VM-H, to the computing object of the VM-H;
receiving, by the VM bus access object of the VM-H, the call from the VM bus system object of the VM-H; and
passing the call from the VM bus access object of the VM-H to the computing object of the VM-H.

15. The method of claim 14 wherein the VM bus access object of each VM is configured to communicate with the VM bus system object of the VM by way of a handle to such VM bus system object.

16. The method of claim 15 further comprising:
administratively opening, by a VM bus pipe mode object of each VM, a channel to the VM bus system object of the VM;
commanding the VM bus to instantiate the pipe mode, the VM bus pipe mode object of each VM obtaining the handle for accessing such VM bus system object of the VM; and
providing the handle to the VM bus access object of the VM.

17. The method of claim 15 further comprising:
administratively opening, by a VM bus pipe mode object of each VM, a channel to the VM bus system object of the VM;
commanding the VM bus to instantiate the pipe mode, the VM bus pipe mode object of each VM obtaining the handle for accessing such VM bus system object of the VM and providing the handle as the VM bus access object of the VM, wherein the handle includes a well-defined set of semantics specifying a stream as an ordered set of bytes and optionally a file pointer that defines a current offset within the stream.

18. The method of claim 11 further comprising:
including, by the VM bus system object of the VM-C, with the forwarded call a description of such call to the VM bus system object of the VM-H.

19. The method of claim 11 further comprising:
issuing a command, by the computing object of the VM-H, to the VM bus system object of the VM-H to read the call from the VM bus;
waiting, by the VM bus system object of the VM-H, for the call on the VM bus in pipe mode as sent from the VM-C; and
reading the call upon receiving the call from the VM bus.

* * * * *

UNITED STATES PATENT AND TRADEMARK OFFICE
CERTIFICATE OF CORRECTION

| | | |
|---|---|---|
| PATENT NO. | : 7,941,800 B2 | Page 1 of 1 |
| APPLICATION NO. | : 11/360126 | |
| DATED | : May 10, 2011 | |
| INVENTOR(S) | : Benjamin A. Leis et al. | |

It is certified that error appears in the above-identified patent and that said Letters Patent is hereby corrected as shown below:

In column 17, line 7, in Claim 12, delete "VM-C:" and insert -- VM-C; --, therefor.

Signed and Sealed this
Nineteenth Day of July, 2011

David J. Kappos
*Director of the United States Patent and Trademark Office*